United States Patent Office

3,113,421
Patented Dec. 10, 1963

3,113,421
DISPIRANE HYDROCARBONS AS HIGH ENERGY FUELS
Stanley D. Koch, Swampscott, Mass., assignor, by mesne assignments, to Monsanto Research Corporation, Everett, Mass., a corporation of Delaware
No Drawing. Filed Sept. 21, 1960, Ser. No. 57,403
9 Claims. (Cl. 60—35.4)

This invention relates to high energy fuels. More particularly, this invention relates to methods of developing thrust and to methods of operating reaction type power plants. This invention especially contemplates high energy fuel compositions comprising a dispirane hydrocarbon having an even number of carbon atoms as an essential ingredient.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engine, exhaustion of the high temperature gases is directed in a rearward direction to produce a true jet propulsion. In a turbine type engine, such as a gas turbine or a turbo-prop engine, the exhaustion of the high temperature gases is directed into a turbine which drives a propeller or other mechanical means for developing a forward thrust. Reaction type power plants may be used in widely different types of vehicles such as spaceships, aircraft, boats, guided missiles, automobiles, and the like.

Heretofore it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP–4 fuel is thermally stable to a temperature of only about 400° F. Therefore, it is desirable to have a fuel which is thermally stable at temperatures at least as high as 500° F.

Another disadvantage of the presently known fuels is that they have high vapor pressures and tend to flash-off rapidly in power plants operated at high elevations and high temperatures, thereby resulting in an appreciable loss of fuel. Although this difficulty can be overcome by pressurizing the fuel tanks, the structural strength of the fuel tanks must also be increased, adding to the weight and volume of the vehicle. Therefore, it is desirable that the fuel have a boiling point at least about 400° F. in order to avoid additional weight and volume requirements.

Another serious disadvantage of the prior art known fuels is the low heat of combustion of such fuels. Aircraft, generally, and particularly military aircraft, are being designed for higher and higher speeds requiring higher energy fuels. The fuel must not only have a high energy level on a weight basis or high B.t.u./lb., but also a high energy level on a volume basis or a high B.t.u./gal. since wing sections are being made thinner in order to reduce drag and the space for storage of fuel is limited. Thus, aircraft are very often volume-limited as well as weight-limited for the storage of fuel. It is particularly desirable to provide a fuel having a high heat of combustion, preferably greater than 18,400 B.t.u./lb. and at the same time obtain the characteristics necessary for a good fuel of this type.

Ordinarily, the heat of combustion of hydrocarbons on a weight basis is proportional to the hydrogen/carbon ratio of the hydrocarbon. Thus, methane has a heat of combustion of 21,502 B.t.u./lb. and a hydrogen/carbon mole ratio of 4:1. Also the paraffin hydrocarbons have very high hydrogen/carbon ratios and, correspondingly, have very high heats of combustion. Unfortunately, these hydrocarbons are not very suitable as high energy fuels because they are either gases or low density liquids at room temperature and, therefore, do not have high heats of combustion on a volume basis.

I have discovered, much to my surprise, that the dispirane hydrocarbons having an even number of carbon atoms have an unexpectedly higher heat of combustion than would be indicated by the hydrogen/carbon ratio.

An object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines including rocket, ram-jet, turbo-jet and pulse-jet engines, and turbine type engines, including turbo-prop and gas turbine engines.

Another object of this invention is to provide high energy fuel compositions containing polycyclic hydrocarbons which are substantially free of tertiary hydrogen atoms.

Other aspects, objects and advantages of this invention will be apparent from a consideration of the accompanying disclosure and the appended claims.

According to the invention, there are provided high energy fuel compositions comprising, as an essential ingredient, a dispirane hydrocarbon having an even number of carbon atoms, preferably a dispirane hydrocarbon of the formula

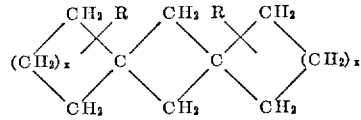

wherein $x$ is an integer of from 1 to 3 inclusive and R is selected from the group consisting of hydrogen and alkyl radicals.

Also, according to the invention, there are provided improved methods of developing thrust, said methods, comprising oxidizing a high energy fuel composition, comprising, as an essential ingredient, a dispirane hydrocarbon having an even number of carbon atoms, preferably a dispirane hydrocarbon as defined above, with an oxidizing agent in a reaction chamber to produce a mass of high temperature gases and exhausting said gases from said reaction chamber in a manner so as to develop a large amount of thrust.

Also, according to the invention, there are provided improved methods of operating reaction type power plants, said methods comprising injecting a stream of an oxidizing agent and a stream of a fuel composition comprising, as an essential ingredient, a dispirane hydrocarbon having an even number of carbon atoms, preferably a dispirane hydrocarbon as defined above, into the combustion chamber of said reaction type power plant in such proportion as to produce a combustible mixture, subjecting said combustible mixture to combustion, and exhausting the resulting gases from said combustion chamber so as to impart thrust thereto.

Preferably, the dispirane hydrocarbon components of the high energy fuel compositions of this invention have an even number of carbon atoms, either 10, 12, or 14 cyclic carbon atoms, and two spiro carbon atoms, e.g., 2 carbon atoms which are each held in common by two cyclic rings. These dispirane hydrocarbons can also be substituted with lower alkyl groups, preferably alkyl groups containing not more than 4 carbon atoms, as shown in the formula above. Thus, the dispirane hydrocarbons of this invention are polycyclic hydrocarbons comprising 3 cycloalkyl groups joined together by 2 spiro carbon atoms. In copending case Serial No. 57,404, filed of even date in the name of Robert J. Wineman, are disclosed and claimed the tricyclic dispirane hydrocarbons having an odd number of carbon atoms.

In the formula of the preferred dispirane hydrocarbons given above, $x$ is an integer of from 1 to 3, inclusive. Thus, where $x$ is the integer 1, the dispirane hydrocarbon is dispiro[3.1.3.1]decane of the formula

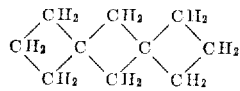

Where $x$ is the integer 2, the dispirane hydrocarbon is dispiro[4.1.4.1]dodecane of the formula

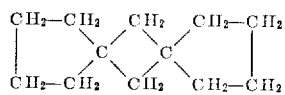

Where $x$ is the integer 3, the dispirane hydrocarbon is dispiro[5.1.5.1]tetradecane of the formula

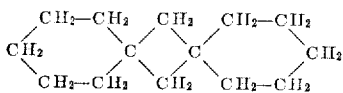

Illustrative examples of some dispirane hydrocarbons of this invention are as follows:

Dispiro[3.1.3.1]decane
1,7-dimethyldispiro[3.1.3.1]decane
1,7-dipropyldispiro[3.1.3.1]decane
2,8-dimethyldispiro[3.1.3.1]decane
2,8-dibutyldispiro[3.1.3.1]decane
1,8-dimethyldispiro[4.1.4.1]dodecane
1,8-diethyldispiro[4.1.4.1]dodecane
2,9-dimethyldispiro[4.1.4.1]dodecane
2,9-dipropyldispiro[4.1.4.1]dodecane
Dispiro[5.1.5.1]tetradecane
1,9-dimethyldispiro[5.1.5.1]tetradecane
1,9-dipropyldispiro[5.1.5.1]tetradecane
2,10-dimethyldispiro[5.1.5.1]tetradecane
2,10-diethyldispiro[5.1.5.1]tetradecane
3,11-dimethyldispiro[5.1.5.1]tetradecane
3,11-dibutyldispiro[5.1.5.1]tetradecane The dispirane hydrocarbons of this invention may be prepared from cycloalkyl ketene dimers by reduction of the carbonyl groups to methylene groups. The cycloalkyl ketene dimer may be formed by reacting a cycloalkyl acid with a thionyl chloride and dehydrohalogenating the resulting product with triethylamine to the cycloalkyl ketene, which spontaneously dimerizes. A preferred method of carbonyl reduction involves replacing each keto group with alkylmercapto groups and simultaneously desulfurizing and reducing the latter groups to form methylene groups. Substitution of the alkylmercapto groups for the keto groups is effected by reaction with an alkyl mercaptan, such as methyl mercaptan or ethyl mercaptan, in the presence of a catalyst such as zinc chloride. In the case of dispirotetradecane and its derivatives, only one keto group is removed in this step and the reaction is repeated after the desulfurization and reduction of the alkylmercapto groups to a methylene group. The desulfurization and reduction steps using Raney nickel catalysts are preferably carried out in a suitable solvent or inert diluent such as ethanol. The Raney nickel catalyst may be prepared from nickel-aluminum alloy (Raney), as is well known to those skilled in the art, by the method described by Mozingo in "Organic Syntheses," collective volume III, 181 (1955).

The advantages, desirability and usefulness of the present invention are illustrated by the following examples.

EXAMPLE 1

In this example, dispiro[5.1.5.1]tetradecane was prepared from hexahydrobenzoic acid as a starting material. In the first step, hexahydrobenzoyl chloride was prepared from 192.3 g. (1.5 moles) of hexahydrobenzoic acid and 214.2 g. (1.8 moles) of thionyl chloride. The hexahydrobenzoic acid was added dropwise under anhydrous conditions over a 2 hour period to the thionyl chloride contained in a stirred reactor and cooled in an ice water bath. After the addition of the hexahydrobenzoic acid had been completed and the evolution of hydrochloric acid had subsided, the reaction mixture was heated in a water bath held at a temperature of 80° C. for a period of 30 minutes. The reaction mixture was then distilled under vacuum to recover the hexahydrobenzoyl chloride boiling at 70–71° C./15 mm. in an amount of 212.1 g.

In the next step, the cyclohexylketene dimer, dispiro-[5.1.5.1]-tetradecan-7,14-dione, was prepared from 212 g. of the hexahydrobenzoyl chloride and 245 g. (2.42 moles) of freshly redistilled triethylamine. The triethylamine was added dropwise under anhydrous conditions to a stirred solution of the hexahydrobenzoyl chloride in 1.5 liters of redistilled benzene which had been dried over sodium. The triethylamine addition required three hours and the mixture was then refluxed overnight. At the end of this time, the triethylamine hydrochloride which had formed during the reaction was removed by filtration. The benzene filtrate was then washed with 6 N hydrochloric acid followed by a thorough washing with water. The benzene was distilled off to leave a solid residue which was recrystallized from ethanol to obtain 93.1 g. of the dispiro[5.1.5.1]-tetradecan-7,14-dione having a melting point of 163–164° C.

In the next step, 147.8 g. (0.671 mole) of the cyclohexyl ketene dimer was reacted with 500 g. (8.0 moles) of ethyl mercaptan to replace one of the keto groups with a bis(ethylmercapto) group and form the 14,14-bis(ethylmercapto)-dispiro[5.1.5.1]tetradecan-7-one. The cyclohexyl ketene dimer and the ethyl mercaptan were introduced into a 2-liter flask along with 44.0 g. (0.323 mole) of freshly fused zinc chloride and 38.8 g. (0.273 mole) of anhydrous sodium sulfate. After the addition of these materials, the flask was stoppered securely and refrigerated overnight. Thereafter, the flask was permitted to stand at room temperature for 24 hours with occasional swirling. At the end of this time, the reaction product was poured into an ice-water mixture and thoroughly extracted with ether. After drying over anhydrous sodium sulfate, the ether extract was distilled leaving a solid residue which was recrystallized from ethanol to yield 176.8 g. (81% yield) of the 14,14-bis(ethylmercapto)-dispiro[5.1.5.1]tetradecan-7-one having a melting point of 58–59° C.

In the next step, the first bis(ethylmercapto)group was reduced to a methylene group to form the dispiro-[5.1.5.1]tetradecan-7-one. In this step, a mixture comprising 80 g. (0.244 mole) of the 14,14-bis(ethylmercapto)-dispiro[5.1.5.1]tetradecan-7-one, 1830 g. of No.

28 Raney nickel catalyst, and 400 ml. of 95% ethanol were refluxed for 48 hours. At the end of this time, the Raney nickel catalyst was then separated by filtration and the ethanolic filtrate concentrated under reduced pressure to obtain 40.0 g. of the dispiro[5.1.5.1]tetradecan-7-one which was recrystallized from acetonitrile to obtain a product having a melting point of 85–87° C.

In the next step, the remaining keto group was replaced with a bis(methylmercapto) group to form the 7,7-bis(methylmercapto)-dispiro[5.1.5.1]tetradecane. In this step, 13.4 g. (0.098 mole) of zinc chloride was fused along the inner wall of a Pyrex bomb. Thereafter, 24 g. (0.116 mole) of dispiro[5.1.5.1]tetradecan-7-one, 13.4 g. (0.094 mole) of anhydrous sodium sulfate, and 123.2 g. (2.56 moles) of methyl mercaptan were introduced into the bomb. The methyl mercaptan was condensed as a liquid in the bomb by cooling the bomb in a Dry Ice-trichloroethylene bath. The bomb was then sealed while still in the cooling bath and thereafter allowed to stand at room temperature for 48 hours with occasional shaking. At the end of this time, the bomb was returned to the cooling bath and opened. The excess mercaptan was permitted to boil off and the residue was extracted with ice water and ether. The ether extract obtained was washed with cold 5% aqueous sodium hydroxide and then with water. After drying over sodium sulfate, the ether was removed under reduced pressure by use of a rotary evaporator to obtain a solid deposit. Recrystallization of the solid from acetonitrile provided 25.1 g. (76% yield) of the 7,7-bis(methylmercapto)-dispiro[5.1.5.1]tetradecane having a melting point of 117–119° C. Analysis of this material was found to be 67.4 wt. percent carbon, 9.9 wt. percent hydrogen, and 22.4 wt. percent sulfur as compared with calculated values of 67.54 wt. percent carbon, 9.92 wt. percent hydrogen, and 22.54 wt. percent sulfur.

In the final step, the dispiro[5.1.5.1]tetradecane was prepared by reducing the bis(methylmercapto) group of the 7,7-bis(methylmercapto)-dispiro[5.1.5.1]tetradecane to a methylene group. In this step, 24 g. (0.084 mole) of 7,7-bis(methylmercapto)dispiro[5.1.5.1]tetradecane, 720 g. of No. 28 Raney nickel catalyst, and 2000 ml. of 95% ethanol were refluxed together for 48 hours. At the end of this time, the Raney nickel catalyst was separated by filtration and the ethanolic filtrate obtained was concentrated to about ½ of its initial volume. Upon dilution of the concentrated filtrate with water, a milky solution was formed which was then thoroughly extracted with petroleum ether (boiling point 60–90° C.). The extract obtained was dried over sodium sulfate and distilled through a Vigreux column to obtain a pale yellow liquid residue. This residue was recrystallized from acetonitrile to obtain 14.0 g. (86% yield) of the dispiro-[5.1.5.1]tetradecane having a melting point of 56.5–58° C. Analysis of this product was found to be 87.4 wt. percent carbon and 12.6 wt. percent hydrogen, as compared with caluculated values of 87.5 wt. percent carbon and 12.6 wt. percent hydrogen. The proposed structure for this compound was confirmed by inspection of the infra-red spectrum and the nuclear magnetic resonance spectrum of the product.

EXAMPLE 2

In this example, a dispiro[5.1.5.1]tetradecane fuel was subjected to inspection tests in order to show the thermal and physical properties of this material and its suitability in the operation of a reaction type power plant. The results of these tests are given in Table 1.

Table 1

THERMAL AND PHYSICAL PROPERTIES OF DISPIRO-[5.1.5.1]TETRADECANE FUEL

| | |
|---|---|
| Hydrogen/carbon ratio | 0.143 |
| Heat of combustion, B.t.u./lb., net | 18,491 |
| Heat of combustion, B.t.u./gal., net | 134,572 |
| Freezing point, °C | 56.5–58 |
| Boiling point, °C./(51 mm.) | 154 |
| Thermal decomposition temp., °F | 725 |
| Density, g./ml. at 26.5° C | 0.872 |

Heats of combustion were obtained with a Parr oxygen bomb calorimeter on both a weight and a volume basis following the ASTM D–240–57T procedure. Freezing point was determined using the ASTM D–1477–57T procedure. Density was determined using a Lipkin bicapillary pycnometer.

The thermal decomposition temperature was obtained using a high temperature, high pressure isoteniscope which consists of a monel bomb capped at one end and connected to a precision pressure gauge by a monel diaphragm. The test fuel was heated within the bomb to an elevated temperature and the temperature was measured at which the fuel began to decompose and evolve gas as determined by the changes in pressure within the bomb. In this method, the formation of deposits in the decomposition reaction is not measured because some fuels may start to decompose to gas before forming deposits.

The above examples indicated that the dispirane hydrocarbons of this invention having an even number of carbon atoms are eminently suitable for use in various reaction type power plants. These dispirane hydrocarbons have unexpectedly high heats of combustion on both a weight and a volume basis and may therefore be very advantageously employed in both jet propulsion type engines and turbine type engines where extremely high energy contents are desirable. Another advantage is utilizing the dispirane hydrocarbons of this invention as reaction type power plant fuels is that they have very high boiling points. It is very desirable to have a fuel with a high boiling point for use in aircraft type engines where the engine encounters low pressures at high altitudes, resulting in loss of large amounts of fuel by vaporization unless the fuel system is fully pressurized.

The dispirane hydrocarbons of this invention are also characterized by unusually high thermal stabilities when employed as fuels for a reaction type power plant. This factor is of importance, not only in the actual combustion taking place in the engine, but also in the fuel system prior to the burning step. For example, it is necessary in high speed aircraft to use the fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone. It is believed that the dispirane hydrocarbons of this invention have particularly high thermal stabilities because of the absence of any tertiary hydrogen atoms in these compounds.

In operating reaction type power plants with the dispirane hydrocarbon fuels of this invention, the fuel and an oxidizing agent are admixed together to form a combustible mixture which is then ignited either by a spark ignition device or by the burning of fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet and gas turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or other chemical oxidizers, for example, fuming nitric acid, hydrogen peroxide, fluorine, and the like in guided missile and rocket applications. In some applications, a mixture of oxidizing agents will also be found to be useful.

The dispirane hydrocarbon fuel compositions of the present invention may be blended with other materials such as gasoline, kerosene, mixtures of gasoline and kerosene, other aviation fuels, and with the present hydrocarbon jet fuels to produce an improved fuel over the presently available fuels. More particularly, the fuels described herein may be added to the present aliphatic hydrocarbon jet fuels having a heat of combustion of about 112,000 B.t.u./gal. to raise the overall heat of combustion thereof to at least 120,000 B.t.u./gal. Moreover, the fuels described herein may be used in combination with fuel additives to improve various characteristics of the fuel, including liquid viscosity, burning characteristics and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be dependent not only upon the power requirement at the moment but also upon the nature of the engine. Thus, turbo-jet engines are preferably operated on a fuel-air ratio of about 0.01 to 0.03 whereas ram-jet engines are usually operated at a fuel-air ratio of from 0.03 to 0.07.

Reasonable variation and modification of the invention as described are possible, the essence of which is that there have been provided (1) high energy fuel compositions containing dispirane hydrocarbons having an even number of carbon atoms as an essential ingredient, (2) improved methods of developing thrust, and (3) methods of operating reaction type power plants.

I claim:
1. The method of developing thrust in a reaction chamber which comprises oxidizing in said chamber a hydrocarbon fuel comprising essentially a dispirane of the formula

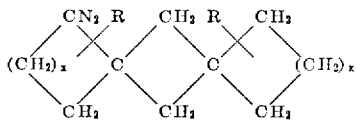

wherein $x$ is an integer of from 1 to 3 and R is selected from the class consisting of hydrogen and alkyl, to produce a mass of high temperature gases and exhausting said gases from said chamber so as to develop thrust.

2. The method of operating a reaction type power plant which comprises injecting into the combustion chamber of said motor an oxidizing agent and a hydrocarbon fuel comprising essentially a dispirane of the formula

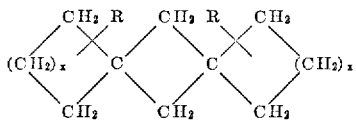

wherein $x$ is an integer of from 1 to 3 and R is selected from the class consisting of hydrogen and alkyl, to effect combustion of said fuel and exhausting the resulting gases from said chamber so as to impart a thrust.

3. The method of operating a jet propulsion engine which comprises injecting into the combustion chamber of said engine a stream of an oxidizing agent and a stream of a hydrocarbon fuel composition comprising essentially a dispirane of the formula

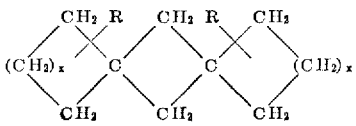

wherein $x$ is an integer of from 1 to 3 and R is selected from the class consisting of hydrogen and alkyl, to effect combustion of said fuel and exhausting the resulting gases in a rearward direction so as to impart thrust to said jet-propulsion engine.

4. The method of operating a gas-turbine engine which comprises injecting into the combustion chamber of said engine a stream of an oxidizing agent and a stream of a hydrocarbon fuel composition comprising essentially a dispirane of the formula

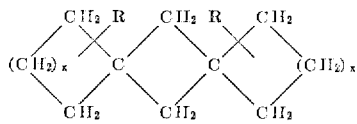

wherein $x$ is an integer of from 1 to 3 and R is selected from the class consisting of hydrogen and alkyl, to effect combustion of said fuel and exhausting the resulting gases from said combustion chamber through a turbine to develop motive power.

5. The method of operating a turbo-jet engine which comprises feeding an oxidizing agent and a hydrocarbon fuel comprising essentially a dispirane of the formula

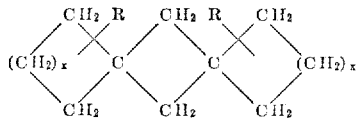

wherein $x$ is an integer of from 1 to 3 and R is selected from the class consisting of hydrogen and alkyl, into the combustion chamber of said engine and effecting combustion of said fuel in said chamber, exhausting the resulting gases from said combustion chamber through a turbine to expand the same and compress the oxidizing agent supplied to said chamber, and passing the resulting gases into the atmosphere by way of a nozzle to impart thrust to said engine.

6. The method of operating a turbo-jet engine which comprises feeding air and a dispirane compound of the formula

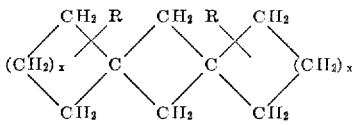

wherein $x$ is an integer of from 1 to 3 and R is selected from the class consisting of hydrogen and alkyl, into the combustion chamber of said engine and burning the dispirane compound in said chamber, exhausting the resulting gases from said combustion chamber through a turbine to expand the same and compress the air supplied to said chamber, and passing the resulting gases into the atmosphere by way of a nozzle to impart thrust to said engine.

7. The method defined in claim 6, further limited in that the dispirane compound is dispiro[3.1.3.1]decane.

8. The method defined in claim 6, further limited in that the dispirane compound is dispiro[4.1.4.1]dodecane.

9. The method defined in claim 6, further limited in that the dispirane compound is dispiro[5.1.5.1]tetradecane.

References Cited in the file of this patent
UNITED STATES PATENTS

| 2,331,596 | Campbell | Oct. 12, 1943 |
| 2,514,546 | Ipatieff et al. | July 11, 1950 |
| 2,765,617 | Gluesenkamp et al. | Oct. 9, 1956 |
| 2,826,037 | Scott et al. | Mar. 11, 1958 |

UNITED STATES PATENT OFFICE
CERTIFICATE OF CORRECTION

Patent No. 3,113,421 December 10, 1963

Stanley D. Koch

It is hereby certified that error appears in the above numbered patent requiring correction and that the said Letters Patent should read as corrected below.

Column 6, line 30, for "is" read -- in --; column 7, lines 37 to 41, the formula should appear as shown below instead of as in the patent:

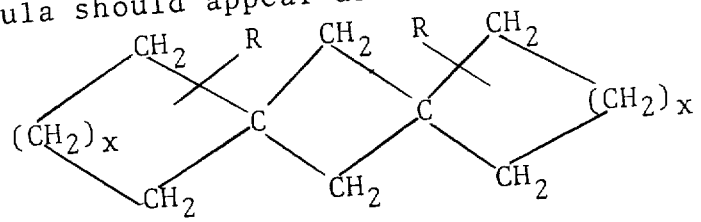

Signed and sealed this 14th day of September 1965.

(SEAL)
Attest:

ERNEST W. SWIDER
Attesting Officer

EDWARD J. BRENNER
Commissioner of Patents